(12) United States Patent
Butler

(10) Patent No.: US 6,900,961 B1
(45) Date of Patent: May 31, 2005

(54) DISK DRIVE HAVING A HEAD DISK ASSEMBLY ENCLOSURE INCLUDING INSERT MOLDED COMPONENTS

(75) Inventor: Walter W. Butler, Scotts Valley, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 131 days.

(21) Appl. No.: 10/232,641

(22) Filed: Aug. 30, 2002

(51) Int. Cl.[7] .................. G11B 5/54; G11B 17/028; G11B 33/02
(52) U.S. Cl. ................ 360/97.01; 360/264.3; 360/99.08; 360/254.7; 360/256
(58) Field of Search ............... 360/97.01, 98.01, 360/98.07, 99.01, 99.04, 99.08, 264.3, 265.2, 265.6, 254.7, 256

(56) References Cited

U.S. PATENT DOCUMENTS

| | | | |
|---|---|---|---|
| 5,025,335 A | 6/1991 | Stefansky ............... | 360/97.01 |
| 5,243,495 A | 9/1993 | Read et al. .............. | 361/685 |
| 5,483,398 A | 1/1996 | Boutaghou ............. | 360/97.02 |
| 5,576,583 A | * 11/1996 | Umehara ................. | 310/13 |
| 5,585,981 A | * 12/1996 | Lee ......................... | 360/264.7 |
| 6,023,392 A | 2/2000 | Kim ........................ | 360/97.01 |
| 6,034,841 A | 3/2000 | Albrecht et al. ......... | 360/97.01 |
| 6,133,660 A | * 10/2000 | Suzuki et al. ............ | 310/90 |
| 6,693,767 B1 | * 2/2004 | Butler ..................... | 360/97.01 |
| 6,760,293 B2 | * 7/2004 | Lee et al. ................ | 720/607 |
| 2004/0017954 A1 | * 1/2004 | Komori et al. ........... | 384/100 |

FOREIGN PATENT DOCUMENTS

| | | |
|---|---|---|
| JP | 10-31178 A | * 2/1998 |
| JP | 2002-155939 A | * 5/2002 |

\* cited by examiner

*Primary Examiner*—Jefferson Evans
(74) *Attorney, Agent, or Firm*—Milad G. Shara, Esq.; Blakely, Sokoloff, Taylor & Zafman

(57) ABSTRACT

Disclosed is disk drive having a molded head disk assembly enclosure including insert molded components and methods for manufacturing the same. In one aspect, the invention may be regarded as a disk drive having a molded enclosure including a base, a cover, and a coupling mechanism to couple the base to the cover. A pivot is insert molded into the base. A first portion of a spindle motor is insert molded into the base. A second portion of a spindle motor is attached to the first portion to form the spindle motor. Further, a disk is mounted to the spindle motor and a head stack assembly having a coil portion is pivotally coupled to the pivot.

34 Claims, 6 Drawing Sheets

DISK DRIVE HAVING A HEAD DISK ASSEMBLY ENCLOSURE INCLUDING INSERT MOLDED COMPONENTS

BACKGROUND OF THE INVENTION

1. Field of the Invention

The present invention relates to disk drives. More particularly, the present invention relates to disk drives having a head disk assembly enclosure including insert molded components and methods for manufacturing such disk drives.

2. Description of the Prior Art and Related Information

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a head with at least one transducer for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the head toward the disk; and (3) a flex cable assembly that provides an electrical interconnect with minimal constraint on movement.

A typical HGA includes a load beam, a gimbal attached to an end of the load beam, and a head attached to the gimbal. The load beam has a spring function that provides a "gram load" biasing force and a hinge function that permits the head to follow the surface contour of the spinning disk. The load beam has an actuator end that connects to the actuator arm and a gimbal end that connects to the gimbal that carries the head and transmits the gram load biasing force to the head to "load" the head against the disk. A rapidly spinning disk develops a laminar airflow above its surface that lifts the head away from the disk in opposition to the gram load biasing force. The head is said to be "flying" over the disk when in this state.

Within the HDA, the spindle motor rotates the disk or disks, which are the media to and from which the data signals are transmitted via the head on the gimbal attached to the load beam. The transfer rate of the data signals is a function of rotational speed of the spindle motor; the faster the rotational speed, the higher the transfer rate. A spindle motor is essentially an electro-magnetic device in which the electro-magnetic poles of a stator are switched on and off in a given sequence to drive a hub or a shaft in rotation, the hub including a permanent magnetic ring.

FIG. 1 shows the principal components of a traditional magnetic disk drive 100 constructed in accordance with the prior art. With reference to FIG. 1, the disk drive 100 is an Integrated Drive Electronics (IDE) drive comprising a HDA 144 and a PCBA 114. The HDA 144 includes a base 116 and a separate, discrete cover 117 attached to the base 116 that collectively house a disk stack 123 that includes a plurality of magnetic disks (of which only a first disk 111 and a second disk 112 are shown in FIG. 1), a spindle motor 113 attached to the base 116 for rotating the disk stack 123, an HSA 120, and a pivot bearing cartridge 184 (such as a stainless steel pivot bearing cartridge, for example) that rotatably supports the HSA 120 on the base 116. The base 116 is typically attached to the separate cover 117 by means of screws or other discrete fasteners. The spindle motor 113 rotates the disk stack 123 at a constant angular velocity about a spindle motor rotation axis 175. The HSA 120 comprises a swing-type or rotary actuator assembly 130, at least one HGA 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160. The actuator arm 160 supports the HGA 110 with a head. The flex cable assembly 180 includes a flex circuit cable and a flex clamp 159. The HSA 120 is pivotally secured to the base 116 via the pivot-bearing cartridge 184 so that the head at the distal end of the HGA 110 may be moved over a recording surface of the disks 111, 112. The pivot-bearing cartridge 184 enables the HSA 120 to pivot about a pivot axis, shown in FIG. 1 at reference numeral 182. The storage capacity of the HDA 111 may be increased by including additional disks in the disk stack 123 and by an HSA 120 having a vertical stack of HGAs 110 supported by multiple actuator arms 160.

Current trends appear to favor ever-smaller disk drives for use in a wide variety of devices, such as digital cameras, digital video cameras and other audio-visual (AV) equipment and portable computing devices, for example. As an example of the ever increasing reduction in size of disk drives, a new 1" form factor disk drive was recently introduced by IBM with the intention of fitting it into a port designed for solid state flash memory.

In traditional larger disk drives, all components are discrete and require many steps to assemble. In these traditional larger disk drives separate components are inserted and secured to a base in a conventional manufacturing process. Usually, one or two components are added and secured (most commonly with screws or press-fits) at each assembly station then moved down stream to subsequent assembly operations. However, with the evolution toward smaller and lower cost disk drives, these traditional methods of manufacture may not be optimal with respect to creating smaller and less expensive disk drives.

As disk drives are designed to fit very small form factors, manufacturing and packaging these small disk drives becomes a very big challenge. How to fit in the disks, heads, voice coil motor (VCM) plates, motors, actuators, etc., in a stiff enclosure to achieve the requisite mechanical requirements is increasingly difficult. Further, in addition to the mechanical requirements, electrical components also take up a significant portion of the available volume in a small form factor drive. Because of the ever more stringent size constraints imposed upon disk drive manufacturers and the highly cost competitive nature of the disk drive industry, disk drive manufacturers are desperately trying to find ways to minimize both disk drive size, as well as costs. Simplifying the manufacturing process is one avenue that disk drive manufacturers are exploring, with the rationale that fewer manufacturing steps lead to smaller and less costly drives. Toward that end, attention has turned to the disk drive enclosure as one possible candidate for size and cost reductions.

SUMMARY OF THE INVENTION

The present invention relates to a disk drive having a molded head disk assembly enclosure including insert molded components and methods for manufacturing such a disk drive.

In one aspect, the invention may be regarded as a disk drive having a molded enclosure including a base, a cover, and a coupling mechanism to couple the base to the cover.

A pivot is insert molded into the base. The disk drive also includes a spindle motor having a first portion and a second portion. The first portion of the spindle motor is insert molded into the base. The second portion of the spindle motor is attached to the first portion to form the spindle motor. Further, a disk is mounted to the spindle motor and a head stack assembly having a coil portion is pivotally coupled to the pivot.

In another aspect, the invention may be regarded as a method of manufacturing a disk drive that comprises a molding step to form a molded enclosure including a base, a cover, and a coupling mechanism to couple the base to the cover. The molding step includes insert molding a pivot into the base and insert molding a first portion of a spindle motor into the base. A second portion of a spindle motor is attached to the first portion of the spindle motor to form the complete spindle motor. Further, the method includes mounting a disk to the spindle motor and pivotally coupling a head stack assembly having a coil portion to the pivot.

In some embodiments, the molding step may include insert molding a base voice coil motor (VCM) plate into the base. Also, the molding step may further include insert molding a cover voice coil motor (VCM) plate into the cover such that when the cover is coupled to the base the coil portion of the head stack assembly is disposed between the cover VCM plate and the base VCM plate. In one embodiment, the pivot may be a pivot shaft that is insert molded into the base and the head stack assembly is pivotally coupled to the pivot shaft. In another embodiment, the pivot is a pivot receptacle that is insert molded into the base and the pivot receptacle receives a centering pin of the head stack assembly such that when the centering pin is coupled to the pivot receptacle the head stack assembly is in turn pivotally coupled to the base.

In additional embodiments, the first portion of the spindle motor that is insert molded into the base may include a mounting bracket, a stator, and a bearing cartridge. In turn, the second portion of the spindle motor that is attached to the first portion to form the spindle motor may include a rotating hub and a spindle shaft. In yet further embodiments, the molding step may include molding a ramp for the head stack assembly into the base. The molding step may also include molding a crash stop for the head stack assembly into the cover. Moreover, the molding step may further include molding a crash stop latch into the cover.

In yet further embodiments, the coupling mechanism that couples the cover to the base may include a hinge. Also, the molding step may be an injection molding step. Further, the molded enclosure may be formed of a plastic material. The plastic material may include a non-plastic filler. For example, the non-plastic filler may include a metallic material. Also, in some embodiments, at least a portion of the base may include a metal.

In another embodiment, the invention may be regarded as a disk drive comprising a molded enclosure including a base, a cover, and a coupling mechanism to couple the base to the cover, wherein the base includes an insert molded mounting skeleton. A pivot is attached to the mounting skeleton. The disk drive also includes a spindle motor having a first portion and a second portion. The first portion of the spindle motor is attached to the mounting skeleton and the second portion of the spindle motor is mounted to the first portion to form the spindle motor. Further, a disk is mounted to the spindle motor and a head stack assembly having a coil portion is pivotally coupled to the pivot.

In one aspect, this embodiment of the invention may be regarded as method of manufacturing a disk drive that comprises a molding step to form a molded enclosure including a base, a cover, and a coupling mechanism to couple the base to the cover, in which the molding step includes insert molding a mounting skeleton within the base. The method further includes the step of attaching a pivot to the mounting skeleton. The method also includes the step of attaching a first portion of a spindle motor to the mounting skeleton and mounting a second portion of the spindle motor to the first portion to form a complete spindle motor. Moreover, the method includes the steps of mounting a disk to the spindle motor and pivotally coupling a head stack assembly having a coil portion to the pivot.

In some embodiments, the method may include the step of attaching a base voice coil motor (VCM) plate to the mounting skeleton. The method may further include the step of insert molding a cover voice coil motor (VCM) plate into the cover, wherein, when the cover is coupled to the base, the coil portion of the head stack assembly is disposed between the cover VCM plate and the base VCM plate. In one embodiment, the pivot is a pivot shaft that is attached to the mounting skeleton and the head stack assembly is pivotally coupled to the pivot shaft. In another embodiment, the pivot may be a pivot receptacle that is attached to the mounting skeleton and the pivot receptacle is to receive a centering pin of the head stack assembly such that when the centering pin is coupled to the pivot receptacle the head stack assembly is pivotally coupled to the base. Further, the first portion of the spindle motor that is attached to the mounting skeleton may include a mounting bracket, a stator, and bearing cartridge and the second portion of the spindle motor that is mounted to the first portion to form the spindle motor may include a rotating hub and a spindle shaft.

In additional embodiments, the method of manufacturing may include the step of molding a ramp for the head stack assembly into the base. Also, the method may include molding a crash stop for the head stack assembly into the cover. The method may further include molding a crash stop latch into the cover.

In further embodiments, the coupling mechanism may include a hinge. In one embodiment, the base, the cover and the hinge of the molded enclosure may be molded together to form a single-piece enclosure in which the base is molded around the mounting skeleton. In a more particular embodiment, the base, the cover, and the hinge of the molded enclosure may be injection molded together, wherein, the base is injection molded around the mounting skeleton. Further, the molded enclosure may be formed of a plastic material. Also, this plastic material may include, for example, a non-plastic filler. Moreover, the mounting skeleton may include a metallic material or may be metal.

The foregoing and other features of the invention are described in detail below and are set forth in the appended claims.

DETAILED DESCRIPTION

Figure 1:
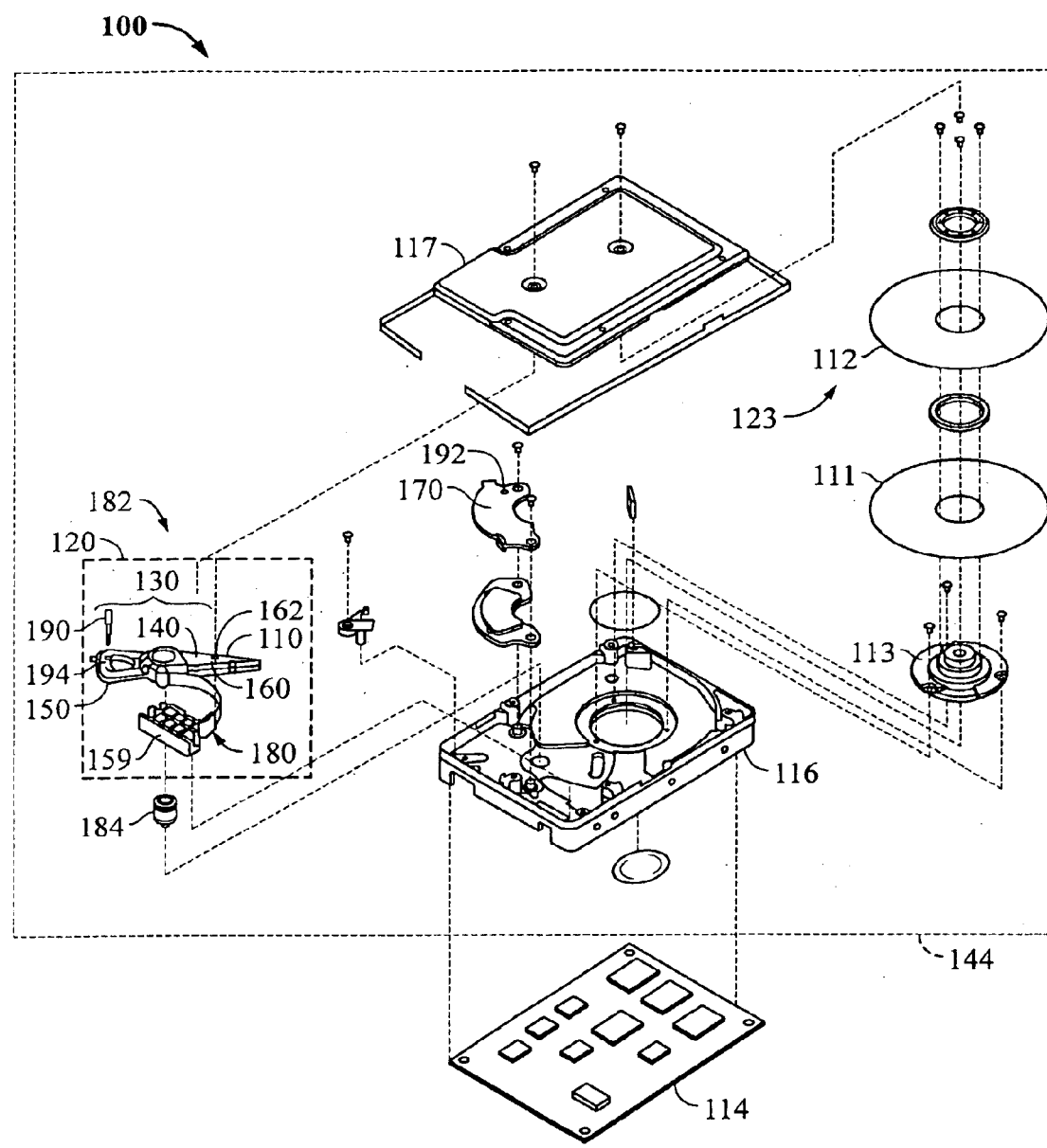
FIG. 1 is an exploded view of a traditional disk drive according to the prior art.
Figure 2A:
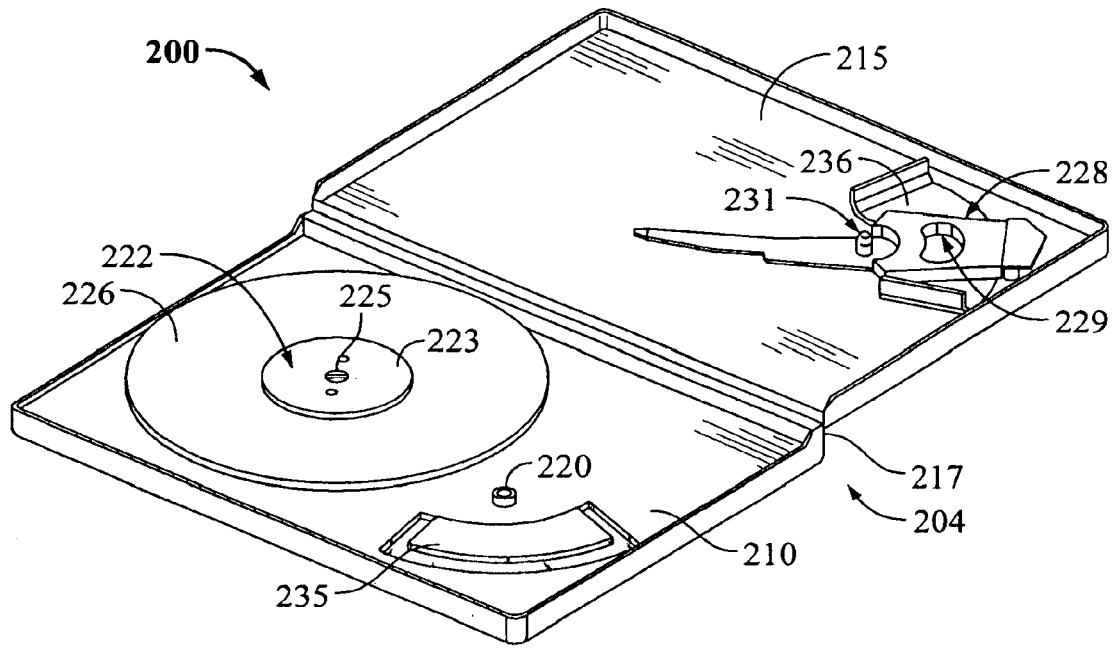
FIG. 2A is a perspective view of a disk drive having a molded head disk assembly (HDA) enclosure including insert molded components, according to one embodiment of the present invention.
Figure 2B:
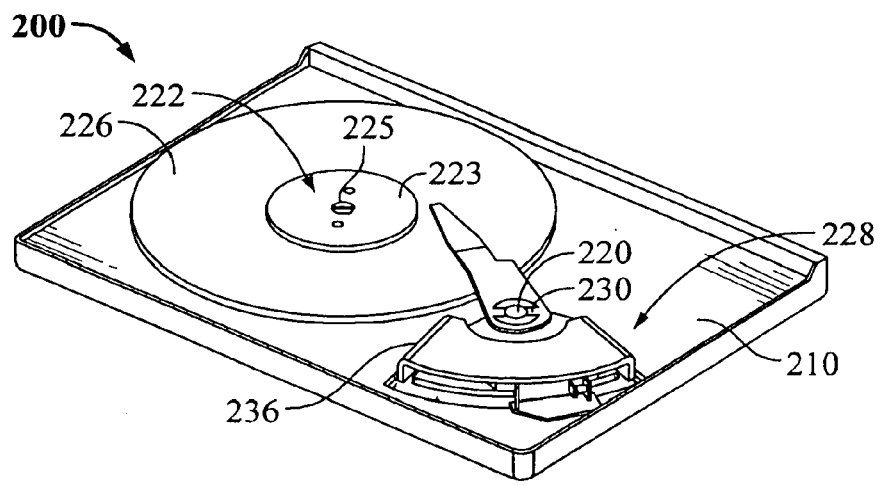
FIG. 2B is a perspective view of the disk drive of FIG. 2A shown with all of the components engaged and the cover removed.

The present invention relates to a disk drive having a molded head disk assembly enclosure including insert molded components and methods for manufacturing such a disk drive. FIG. 2A is a perspective view of a disk drive 200 having a molded head disk assembly (HDA) enclosure 204 including insert molded components, according to one embodiment of the present invention. FIG. 2B is a perspective view of the disk drive of FIG. 2A shown with all of the components engaged and the cover removed. With reference to FIGS. 2A and 2B collectively, the molded HDA enclosure 204 includes a base 210, a cover 215, and a coupling mechanism, such as a hinge 217, to couple the base 210 to the cover 215. A pivot 220 is insert molded into the base 210. The disk drive 200 also includes a spindle motor 222. The spindle motor 222 may be insert molded into the base 210.

Also, as will be discussed in more detail later, a first portion of the spindle motor 222 may be insert molded into the base 210. A second portion of the spindle motor 222 may then be attached to the first portion to form the spindle motor 222. For example, the first portion of the spindle motor 222 that is insert molded into the base 210 may include a mounting bracket, a stator, and a bearing cartridge. The second portion of the spindle motor that is in turn attached to the first portion to form the complete spindle motor 222 may include a rotating hub 223 and a spindle shaft 225. A disk 226 is mounted to the spindle motor 222. As those of skill in the art will recognize, although only one such disk 226 is shown in the embodiment illustrated in FIGS. 2A and 2B, it should be understood that more than one disk 226 may be mounted to the spindle motor 222. Also, disk drive 200 further includes a printed circuit board assembly (not shown) suitably attached to the base 210.

Further, a head stack assembly 228 having a coil portion 229 is pivotally coupled to the pivot 220 such that the head stack assembly 228 may be pivotally coupled to the base 210. In one embodiment, the pivot 220 may be a pivot shaft that is insert molded into the base 210 and the head stack assembly 228 is pivotally coupled to the pivot shaft 220. For example, a bearing cartridge 230 may be used in pivotally coupling the head stack assembly 228 to the pivot shaft 220. In another embodiment, the pivot 220 is a pivot receptacle that is insert molded into the base 210 and the pivot receptacle 220 receives a centering pin 231 of the head stack assembly 228 such that when the centering pin 231 is coupled to the pivot receptacle (e.g. when the cover 215 is closed), the head stack assembly 228 is in turn pivotally coupled to the base 210. Again, a bearing cartridge 230 may be used in pivotally coupling the head stack assembly 228 to the base 210. This embodiment is particularly shown in FIG. 2A.

Additionally, in some embodiments, a base voice coil motor (VCM) plate 235 may be insert molded into the base 210. Further, a cover voice coil motor (VCM) plate 236 may be insert molded into the cover 215 such that when the cover 215 is coupled to the base 210 the coil portion 229 of the head stack assembly 228 is disposed between the cover VCM plate 236 and the base VCM plate 235.

Figure 2C:
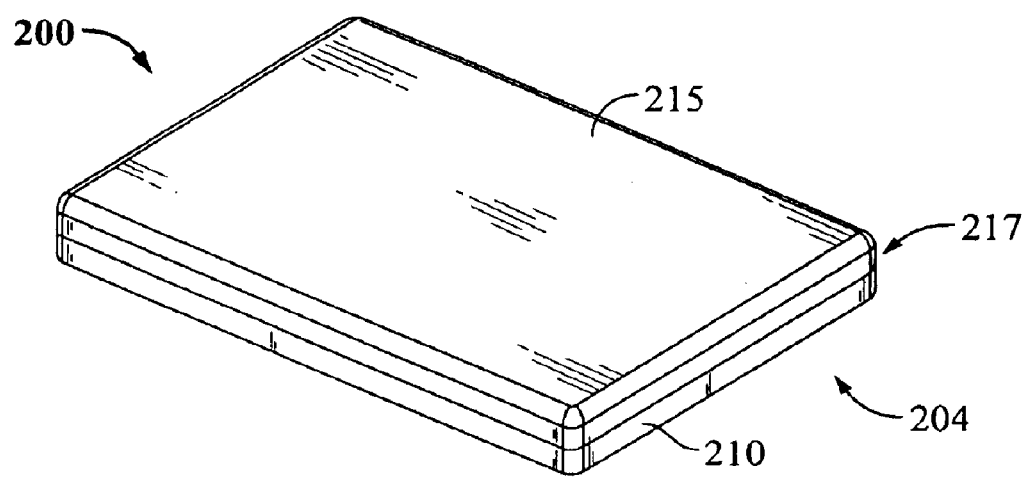
FIG. 2C is a perspective view of the disk drive of FIG. 2A in which the molded HDA enclosure is in the closed position.

The coupling mechanism of the molded HDA enclosure 204 that couples the base 210 to the cover 215 may include a standard coupling mechanism such as the use of fasteners, screws, threaded inserts, snaps, etc. However, in a preferred embodiment, the coupling mechanism includes a hinge 217. In this way, the molded HDA enclosure 204 may be manufactured as a single integrated component. That is, rather than individually manufacturing a base, a cover and screws to join the base to the cover, the entire molded HDA enclosure 204 including the base 210, the cover 215 and the hinge 217 may be formed as a single piece enclosure 204 in a single manufacturing step, such as a molding step. For example, this molding step may be an injection-molding step. Further, the molded HDA enclosure 204 may be formed of a plastic material. Thus, the molded HDA enclosure 204, according to one embodiment of the present invention, has no external screws or fasteners to attach the cover to the base. Towards that end, the base 210, the cover 215 and the hinge 217 of the molded HDA enclosure 204 may be unitarily molded to form a single piece enclosure by, for example, an injection molding process. For example, FIG. 2C is a perspective view of the disk drive 200 of FIG. 2A in which the molded HDA enclosure 204 is in the closed position.

Figure 3A:
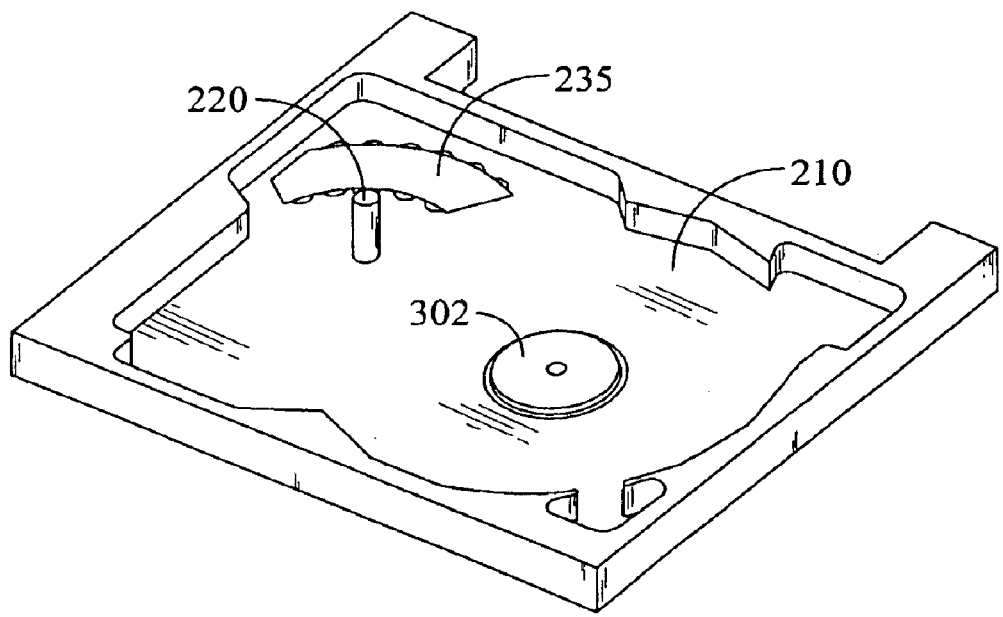
FIG. 3A is a perspective view of the fully molded base with a base voice coil motor (VCM) plate, a pivot, and a spindle motor insert molded therein.
Figure 3B:
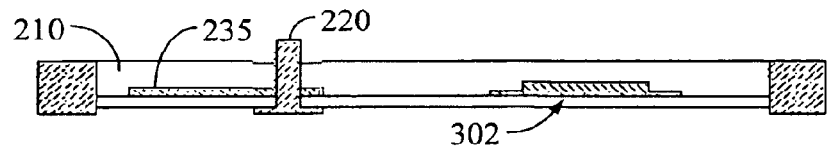
FIG. 3B is a cross-sectional view of the molded base of FIG. 3A.

With reference now to FIG. 3A, FIG. 3A shows a perspective view of a fully molded base 210 with a base VCM plate 235, a pivot 220, and a spindle motor 302 insert molded therein. FIG. 3B is a cross-sectional view of the molded base 210 of FIG. 3A. Considering now FIGS. 3A and 3B together, according to one embodiment of the present invention, it is particularly shown that the pivot 220 is insert molded into the base 210. As previously discussed, the pivot 220 may be either a pivot shaft to which the head stack assembly is directly mounted or a pivot receptacle that receives a complementary centering pin of the head stack assembly. Here, the pivot 220 is shown as a pivot shaft. In either case, the pivot 220 pivotally mounts the head stack assembly to the molded base 210. Further, as particularly shown in FIGS. 3A and 3B the base VCM plate 235 is also insert molded into the base 210. Moreover, a spindle motor 302 is particularly shown as being insert molded into the molded base 210.

Figure 3C:
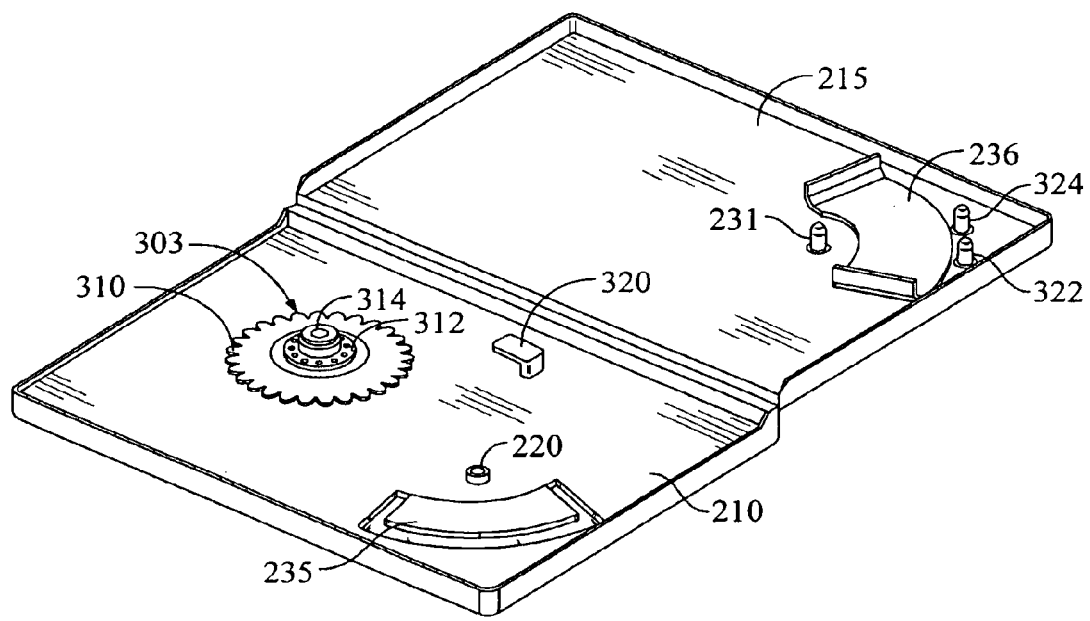
FIG. 3C is a perspective view of the fully molded base and cover with molded-in features and a first portion of a spindle motor insert molded therein.

Turning now to FIG. 3C, FIG. 3C is a perspective view of the fully molded base and cover with molded-in features and a first portion of a spindle motor insert molded therein. As shown in FIG. 3C, in this embodiment, the first portion 303 of the spindle motor that is insert molded into the molded base 210 includes a mounting bracket 310, a stator 312, and a bearing cartridge 314. As previously discussed, with reference to FIGS. 2A and 2B, a second portion of the spindle motor including a rotating hub 223 and spindle shaft 225 may be attached to the first portion 303 to form the complete spindle motor. Also, FIG. 3C shows the centering pin 231 insert molded into the cover 215 for mating with the pivot receptacle 220 of the base 210 to pivotally mount the head stack assembly, as previously discussed. Further, specialized molded-in features can be molded into the base 210 and cover 215. For example, a ramp 320 for the head stack assembly can be molded into the base 210. Crash stops 322 and 324 for the head stack assembly may be molded into the cover 215. Furthermore, crash stop 324 may include a magnet such that it is a crash stop latch for the head stack assembly. It should be appreciated that a wide variety of other molded-in features can be molded into the base 210 and cover 215.

Figure 4A:
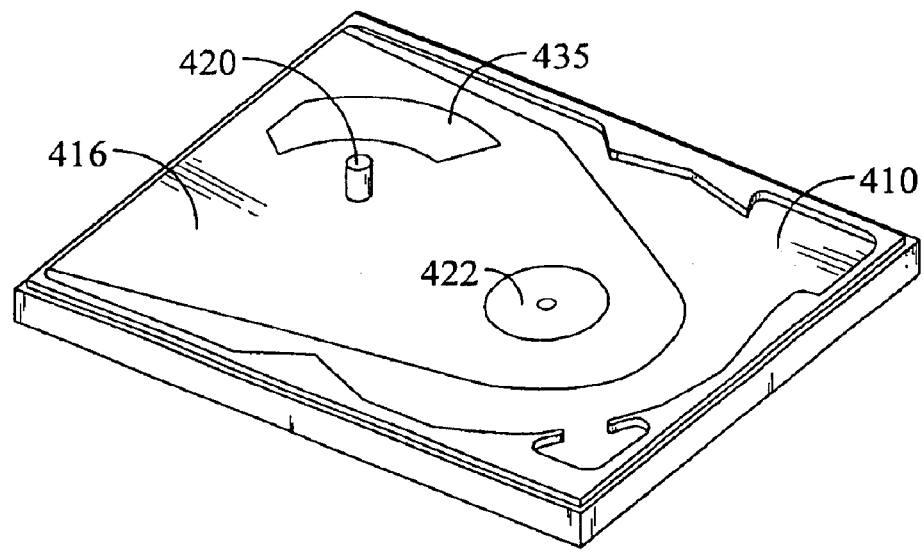
FIG. 4A is a perspective view of a fully molded base having an insert molded mounting skeleton and a base voice coil motor (VCM) plate, a pivot, and a spindle motor attached to the mounting skeleton.
Figure 4B:
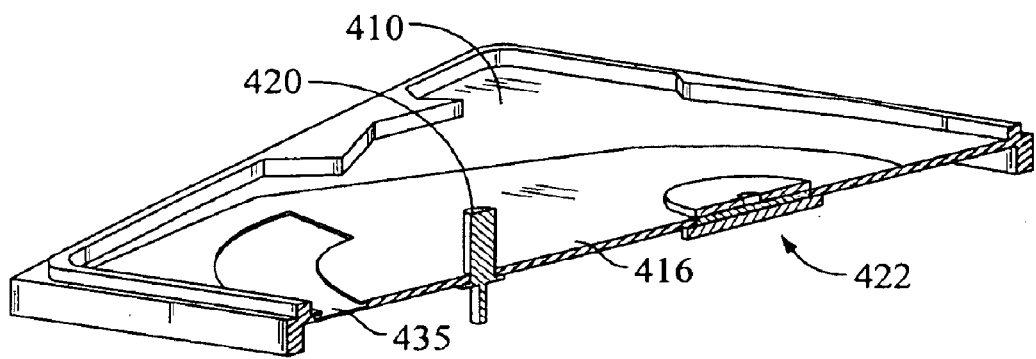
FIG. 4B is a cross-sectional view of the molded base of FIG. 4A.

In another embodiment of the present invention for a disk drive having a molded HDA enclosure including insert molded components, an insert molded mounting skeleton may be used. FIG. 4A is a perspective view of a fully molded base having an insert molded mounting skeleton and FIG. 4B is a cross-sectional view of the molded base of FIG. 4A. Referring to FIGS. 4A and 4B collectively, a fully molded base 410 having an insert molded mounting skeleton 416 is shown. It should be appreciated that the molded base 410 with the insert molded mounting skeleton 416 may be used in conjunction with the cover 215 and the coupling mechanism (such as a hinge 217) as discussed previously with reference to FIGS. 2A and 2B, to form a complete molded HDA enclosure 204. Continuing with the present embodiment, a pivot 420 is attached to the mounting skeleton 416. Again, as previously discussed with reference to FIGS. 2A and 2B, the pivot 420 may be a pivot shaft or a pivot receptacle. Further, a base VCM plate 435 is attached to the mounting skeleton 416. Moreover, a spindle motor 422 is attached to the mounting skeleton 416.

As previously discussed, in one embodiment the pivot 420 may be a pivot shaft that is attached to the mounting skeleton 416 and the head stack assembly 228 is pivotally coupled to the pivot shaft. Here, the pivot 420 is shown as a pivot shaft. In another embodiment, the pivot 420 may be a pivot receptacle that is attached to the mounting skeleton and the pivot receptacle receives a center pin 231 of the head stack assembly 228 such that when the centering pin 231 is coupled to the pivot receptacle the head stack assembly 228 is pivotally coupled to the base 410. Further, when the cover 215 is coupled to the base 410, the coil portion 229 of the head stack assembly 228 is disposed between the cover VCM plate 236 and the base VCM plate 435. This embodiment wherein the molded base 410 includes a mounting skeleton 416 insert molded therein is nearly identical to the fully molded base 210 embodiment, previously discussed with reference to FIGS. 2A–3B. As shown in FIGS. 2A and 2B, a disk 226 may be mounted to the spindle motor 422 and a head stack assembly 228 having a coil portion 229 may be pivotally coupled to the pivot 420. Thus, the embodiment having a molded base 410 with an insert molded mounting skeleton 416 is nearly identical to the previously described fully molded base 210 embodiment.

Figure 4C:
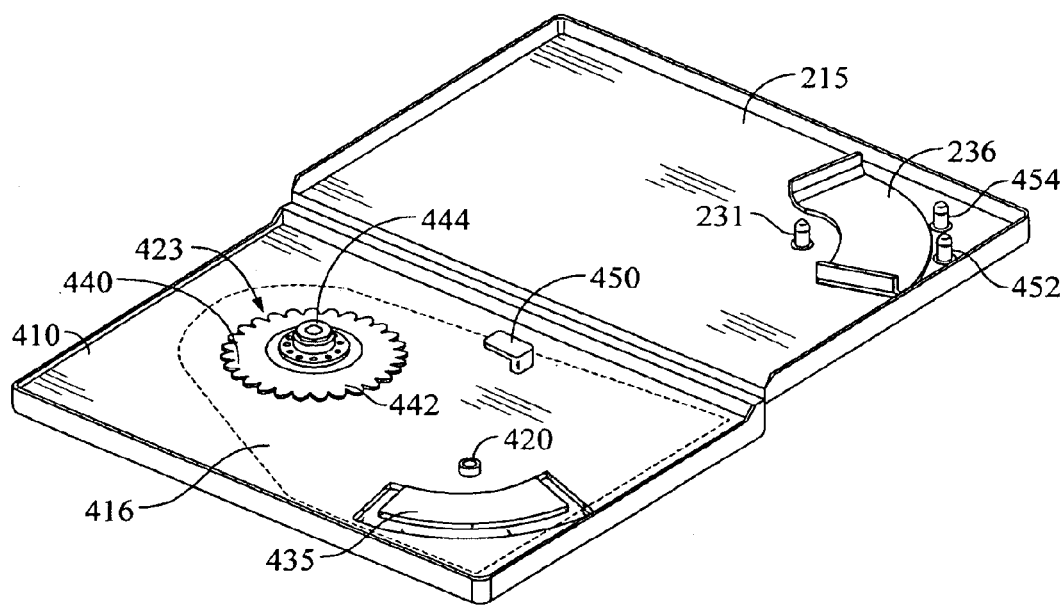
FIG. 4C is a perspective view of the fully molded base having an insert molded mounting skeleton and cover with molded-in features and a first portion of a spindle motor attached to the mounting skeleton.

Further, looking at FIG. 4C, FIG. 4C is a perspective view of a fully molded base 410 having an insert molded mounting skeleton 416 and cover 215 with molded-in features and a first portion 423 of a spindle motor attached to the mounting skeleton 416 of the base 410. As shown in FIG. 4C, in this embodiment, the first portion 423 of the spindle motor is attached to the mounting skeleton 416 and includes a mounting bracket 440, a stator 442, and a bearing cartridge 444. As previously discussed, with reference to FIGS. 2A and 2B, a second portion of the spindle motor including a rotating hub 223 and spindle shaft 225 may be attached to the first portion 423 to form the complete spindle motor. Also, FIG. 4C shows the centering pin 231 insert molded into the cover 215 for mating with the pivot receptacle 420 of the base 410 to pivotally mount the head stack assembly, as previously discussed. Further, specialized molded-in features can be molded into the base 410 and cover 215. For example, a ramp 450 for the head stack assembly can be molded into the base 410. Crash stops 452 and 454 for the head stack assembly may be molded into the cover 215. Furthermore, crash stop 454 may include a magnet such that it is a crash stop latch for the head stack assembly. It should be appreciated that a wide variety of molded-in features can be molded into the base 410 and cover 215.

The molded HDA enclosure 204, using either the fully molded base 210 or the molded base 410 with the insert molded mounting skeleton 416, may be manufactured as a single integrated component. That is, rather than individually manufacturing a base, a cover and screws to join the base to the cover, the entire molded HDA enclosure 204 including the base, cover and hinge may be formed as a single-piece enclosure 204 in either a single manufacturing step or very few manufacturing steps.

The molded HDA enclosure 204, according to one preferred embodiment of the present invention, may utilize a hinge 217 to couple the cover 215 to the base 210 or 410. Toward that end, the base, the cover and the hinge of the molded HDA enclosure 204 may be unitarily molded to form a single-piece enclosure 204 by, for example, an injection molding process. Particularly, in the base 410 with the insert molding mounting skeleton 416 embodiment, the base 410 is injection molded around the mounting skeleton 416. The mounting skeleton 416 may include a metallic material or may be formed completely out of a metal.

The molded HDA enclosure 204 may be formed of, or may include, one or more plastic materials. The molded HDA enclosure 204 is preferably rigid. A suitable material for the molded HDA enclosure 204 (or portions thereof) is a plastic material such as a polycarbonate, for example. The hinge 217 may be formed of the same material as the cover 215 and the base 210 or 410. In fact, the molded HDA enclosure 204 may be formed of, or include, a single plastic material or may be formed of a dual molding process using two (or more) plastic materials. For example, the base 210 or 410 and the cover 215 may be formed of a hard plastic material and the hinge 217 may be formed of, or may include, a relatively more compliant plastic material.

The molded HDA enclosure 204 preferable also mitigates the effects of interference, of both the electromagnetic (EMI) and high frequency (HF) kinds. Accordingly, the plastic material of the molded HDA enclosure 204 may include a non-plastic filler, to shield the disk drive 200 against EMI and/or HF interference. Other fillers may be incorporated in the molded HDA enclosure 204 for other purposes, such as to increase the rigidity of the molded HDA enclosure 204 for example. According to one embodiment of the present invention, the non-plastic filler may include a conductive material. For example, the base 210 or 410 of the molded HDA enclosure 204 may include or be formed of a plastic material that includes a conductive filler material to render the base 210 or 410 conductive. Advantageously, this enables the grounding of the base 210 or 410 when mounting the head stack assembly 218 thereon. The plastic material of the molded HDA enclosure 204 may also include a filler having an electromagnetic shielding characteristics.

Further, at least a portion of the base 210 may include a metal. As previously discussed, in one example, a metal skeleton 416 is provided, over which the base 410 may be injection molded, optionally together with the cover 215 and/or the hinge 217. The metal skeleton structure 416 may advantageously form a conductive grounding plane and increase the structural rigidity of the molded HDA enclosure 204. According to other embodiments, the base 210 or 410 and/or the cover 215 may be formed of, or include, a non-plastic and the hinge 217 may be insert molded onto the base 210 or 410 and/or the cover 215. Such a non-plastic material may include one or more metals.

Advantageously, in one embodiment of the method, a single molding step (such as an injection molding step) may form the molded HDA enclosure 204 including the base 210 (or the base 410 with the mounting skeleton 416), the cover 215 and the hinge 217 that mechanically couples the base 210 or 410 to the cover 215. Additionally, the specialized molded-in features of the base and cover, previously discussed, may be molded in the base and cover during the molding step. Further, to complete the manufacture of the disk drive 200, a second portion of the spindle motor is attached to the first portion of the spindle motor already insert molded into the base 210 (or attached to the mounting skeleton 416 of the base 410), the disk or disks 216 may then be mounted to the completed spindle motor 222, and the head stack assembly 218 may then be pivotally coupled to the pivot 220 previously insert molded to the base 210 (or attached to the mounting skeleton 416 of the base 410).

Alternatively, according to another embodiment of present method, the base 210 or 410 and the cover 215 may be separately provided and a hinge may be molded (by an insert molding process, for example) onto the base and the cover to mechanically couple the base to the cover. As a further alternative, other coupling mechanisms such as screws, fasteners, threaded inserts, snaps, etc., may be used to couple the base to the cover. Such embodiments enable the base and the cover to be separately manufactured and to exhibit any desired characteristic while maintaining the previously addressed advantages inherent in the previously described disk drive having a molded HDA assembly enclosure including insert molded components. Any desirable combination of the above detailed methods and structures may be implemented within the context of the present invention. For example, the plastic material of the base and/or the cover may include a glass material to lend additional rigidity in the shielding properties of the molded HDA enclosure 204. Structural features requiring greater rigidity may be formed of a more rigid material while other features may be formed of relatively less rigid material. Moreover, as previously described the base, the cover and the hinge may be molded together or separately.

Further, it should be appreciated that many other structural features may be insert molded into the base or cover of the molded HDA enclosure including, interconnect pads, flex circuits and/or printed circuit board assemblies, and latch magnets (latch or inertial pins), crash stops, latches, and HSA ramp features. All of these features can be molded directly into the base or into the cover during the insert molding operation. An obvious benefit of the present invention is in parts handling, i.e. it is easier to handle one larger part than several discrete components. An additional benefit of the molded HDA enclosure with insert molded components of the invention is in component location placement and accuracy. With components insert molded in place and/or attached to a mounting skeleton, there is no pre-alignment and securing necessary. Furthermore, by having component features already molded into the enclosure or attached to a mounting skeleton, this also reduces tolerance stack-up errors, which create assembly margin problems. Moreover, various tooling and other manufacturing features can be molded during the insert molding process to enable a more robust assembly with reduced tolerance problems between drive components and features and manufacturing location points. Additionally, conductive paths can be exposed for contact with the HSA flex circuit and/or HDA interconnect to a final electronic device (e.g. phone, personal digital assistant, etc.)

Other modifications will occur to those of skill in this art and all such modifications are deemed to fall within the scope of the present invention.

I claim:

1. A disk drive, comprising:
   a molded enclosure including a base, a cover, and a coupling mechanism to couple the base to the cover;
   a pivot insert molded into the base;
   a spindle motor including a first portion and a second portion, the first portion of the spindle motor insert molded into the base, the second portion of the spindle motor attached to the first portion to form the spindle motor;
   a disk mounted to the spindle motor; and
   a head stack assembly having a coil portion pivotally coupled to the pivot.

2. The disk drive of claim 1, further comprising a base voice coil motor (VCM) plate insert molded into the base.

3. The disk drive of claim 2, further comprising a cover voice coil motor (VCM) plate insert molded into the cover, wherein, when the cover is coupled to the base, the coil portion of the head stack assembly is disposed between the cover VCM plate and the base VCM plate.

4. The disk drive of claim 1, wherein, the pivot is a pivot shaft that is insert molded into the base and the head stack assembly is pivotally coupled to the pivot shaft.

5. The disk drive of claim 1, wherein, the pivot is a pivot receptacle that is insert molded into the base, the pivot receptacle to receive a centering pin of the head stack assembly such that when the centering pin is coupled to the pivot receptacle the head stack assembly is pivotally coupled to the base.

6. The disk drive of claim 1, wherein, the first portion of the spindle motor that is insert molded into the base includes a mounting bracket, a stator, and a bearing cartridge.

7. The disk drive of claim 6, wherein, the second portion of the spindle motor attached to the first portion of the spindle motor to form the spindle motor includes a rotating hub and a spindle shaft.

8. The disk drive of claim 1, further comprising a ramp for the head stack assembly molded into the base.

9. The disk drive of claim 1, further comprising a crash stop for the head stack assembly molded into the cover.

10. The disk drive of claim 1, further comprising a crash stop latch molded into the cover.

11. The disk drive of claim 1, wherein, the coupling mechanism includes a hinge.

12. The disk drive of claim 11, wherein, the base, the cover, and the hinge of the molded enclosure are molded together to form a single-piece enclosure.

13. The disk drive of claim 11, wherein, the base, the cover, and the hinge of the molded enclosure are injection molded together.

14. The disk drive of claim 1, wherein the molded enclosure is formed of a plastic material.

15. The disk drive of claim 14, wherein the plastic material includes a non-plastic filler.

16. The disk drive of claim 15, wherein the non-plastic filler includes a metallic material.

17. The disk drive of claim 1, wherein at least a portion of the base includes a metal.

18. A disk drive, comprising:
- a molded enclosure including a base, a cover, and a coupling mechanism to couple the base to the cover, the base including an insert molded mounting skeleton;
- a pivot attached to the mounting skeleton;
- a spindle motor including a first portion and a second portion, the first portion of the spindle motor attached to the mounting skeleton, the second portion of the spindle motor mounted to the first portion to form the spindle motor;
- a disk mounted to the spindle motor; and
- a head stack assembly having a coil portion pivotally coupled to the pivot.

19. The disk drive of claim 18, further comprising a base voice coil motor (VCM) plate attached to the mounting skeleton.

20. The disk drive of claim 19, further comprising a cover voice coil motor (VCM) plate insert molded into the cover, wherein, when the cover is coupled to the base, the coil portion of the head stack assembly is disposed between the cover VCM plate and the base VCM plate.

21. The disk drive of claim 18, wherein, the pivot is a pivot shaft that is attached to the mounting skeleton and the head stack assembly is pivotally coupled to the pivot shaft.

22. The disk drive of claim 18, wherein, the pivot is a pivot receptacle that is attached to the mounting skeleton, the pivot receptacle to receive a centering pin of the head stack assembly such that when the centering pin is coupled to the pivot receptacle the head stack assembly is pivotally coupled to the base.

23. The disk drive of claim 18, wherein, the first portion of the spindle motor that is attached to the mounting skeleton includes a mounting bracket, a stator, and a bearing cartridge.

24. The disk drive of claim 23, wherein, the second portion of the spindle motor mounted to the first portion of the spindle motor to form the spindle motor includes a rotating hub and a spindle shaft.

25. The disk drive of claim 18, further comprising a ramp for the head stack assembly molded into the base.

26. The disk drive of claim 18, further comprising a crash stop for the head stack assembly molded into the cover.

27. The disk drive of claim 18, further comprising a crash stop latch molded into the cover.

28. The disk drive of claim 18, wherein, the coupling mechanism includes a hinge.

29. The disk drive of claim 28, wherein, the base, the cover, and the hinge of the molded enclosure are molded together to form a single-piece enclosure, the base being molded around the mounting skeleton.

30. The disk drive of claim 28, wherein, the base, the cover, and the hinge of the molded enclosure are injection molded together, the base being injected molded around the mounting skeleton.

31. The disk drive of claim 18, wherein, the molded enclosure is formed of a plastic material.

32. The disk drive of claim 31, wherein, the plastic material includes a non-plastic filler.

33. The disk drive of claim 18, wherein, the mounting skeleton includes a metallic material.

34. The disk drive of claim 18, wherein, the mounting skeleton is metal.

* * * * *